United States Patent Office 3,231,053
Patented Jan. 25, 1966

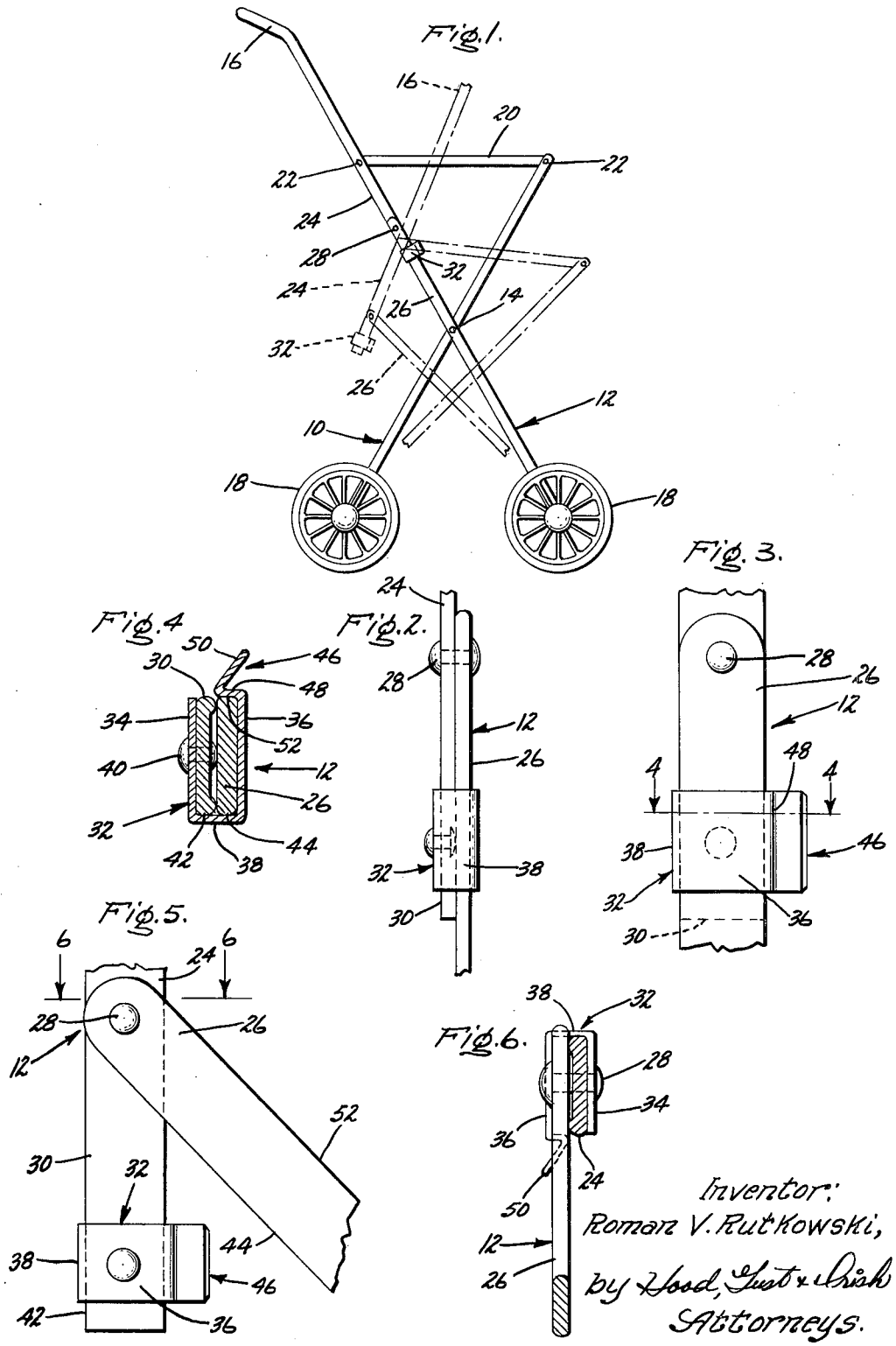

3,231,053
COLLAPSIBLE DOLL STROLLER CHASSIS
Roman V. Rutkowski, South Bend, Ind., assignor to South Bend Toy Manufacturing Co., Inc., South Bend, Ind.
Filed Mar. 19, 1962, Ser. No. 180,773
6 Claims. (Cl. 52—646)

The present invention relates to a chassis lock for a collapsible doll stroller and more particularly to a locking device for securing a collapsible stroller in erected condition.

Doll strollers and carriers are designed to have the same or similar appearance as the real item; yet they must be less expensive and quite simple to operate. Baby strollers and carriages are conventionally transported in automobiles and the like, and therefore are designed to be collapsible so as to reduce the size thereof during transporting. In order to secure these baby carriages and strollers in erected form, and to prevent the accidental collapse thereof, a locking device which is failproof and safe must be used, such a device being relatively expensive. In providing doll strollers or carriages which are collapsible, it is desirable to duplicate the appearance and functioning of the real item without incurring the same expense in materials and construction.

It is therefore an object of this invention to provide a collapsible chassis having a locking mechanism which is simple in construction, easy to operate and relatively inexpensive to manufacture.

It is another object of this invention to provide a locking device for two movably connected frame members whereby the latter may be releasably locked together to provide a rigid frame unit.

It is a further object of this invention to provide a locking device for two pivotally connected frame members whereby the latter may be locked into the form of an elongated frame unit.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation of a doll stroller or carriage chassis constructed in accordance with the principles of this invention;

FIG. 2 is an edge view of a portion of two frame members pivotally connected together which are locked together by means of a locking device of this invention;

FIG. 3 is a side view of the arrangement of FIG. 2;

FIG. 4 is a cross-sectional view taken substantially along section line 4—4 of FIG. 3;

FIG. 5 is a view similar to FIG. 3 but with the frame members unlocked and swung apart; and FIG. 6 is a sectional view taken substantially along line 6—6 of FIG. 5.

Referring to the drawings, and more particularly to FIG. 1, a collapsible chassis is shown as comprising two legs 10 and 12 which are crossed in scissors fashion and pivotally connected intermediate the ends thereof by means of a rivet or the like 14. The leg 12 is extended upwardly into a handle portion 16, the lower ends of the two legs 10 and 12 carrying wheels 18. An elongated, rigid rail 20 formed of strap steel or the like is pivotally connected at its opposite ends by means of rivets 22 to the upper end portions of the two legs 10 and 12 as shown, the rail 20 extending in a horizontal plane when the chassis is erected to the full line position shown in FIG. 1.

It will be understood that the construction just described is duplicated for the opposite side of the chassis such that the latter will be provided with four legs 10, 12 as well as four wheels 18 and another horizontal rail 20.

The leg 12 comprises two, rigid, elongated bars 24 and 26 which are pivotally connected together by means of a rivet 28 or the like. More specifically, the bars 24 and 26 are substantially flat with the flat sides thereof being in engagement such as shown more clearly in FIGS. 2, 3 and 4. The bar 24 is extended beyond the pivotal connection 28 to provide an elongated extension 30 which overlies the bar 26 as shown in FIGS. 1, 2 and 3 when the two bars are locked together.

A spring metal locking clip, generally indicated by the reference numeral 32, is preferably formed of strap metal stock substantially to a U-shape as shown more clearly in FIGS. 4 and 6. Thus shaped, the clip 32 has two arm portions 34 and 36 which are joined at one end thereof by a base portion 38, these portions being preformed to hold substantially the shape shown in FIG. 4. The clip 32 straddles the extension 30 and bar 26 as shown in FIG. 4 with the arm portions 34 and 36 engaging, respectively, the outer sides of the extension 30 and bar 26. A rivet 40 secures the arm 34 to the extension 36, and the base portion 38 of the clip extends across the rear edges 42 and 44 of the extension 30 and bar 26, respectively, in engagement therewith.

The clip 32 is also provided with a latch portion indicated generally by the reference numeral 46 which is formed by bending the end of the clip arm 36 into the shape shown in FIG. 4. This shape includes two latch portions 48 and 50, the portion 48 extending inwardly across and in engagement with the edge 52 of the bar 26 and the portion 50 extending angularly outwardly away from the portion 48 to a point which preferably is beyond the plane of the outer side of the bar 26. The portion 48 preferably extends inwardly a distance approximately equal to the thickness of the bar 26.

The full line drawing of FIG. 1 and FIGS. 2, 3 and 4 illustrate the bars 24 and 26 as being locked into a single, elongated frame member. In the dashed line drawing of FIG. 1 and in FIGS. 5 and 6, the bars 24 and 26 are shown as being unlocked and pivoted out of alignment with each other.

With the clip 32 mounted on the bar extension 30 at a distance remote from the pivotal connection 28, and with the bar 26 being straddled (FIG. 4) across the opposite edges thereof by the base portion 38 and latch portion 48, it is seen that the two bars 24 and 26 are locked together into a single elongated frame member which serves as the leg 12 of the chassis of FIG. 1. If it is desired to collapse the chassis of FIG. 1, it is only necessary that the portion 50 of the latch 46 be moved outwardly a distance sufficient to clear the portion 48 from the bar edge 52, at which time the chassis may be collapsed or otherwise pivoted in the manner shown by the dashed line drawing in FIG. 1. When the chassis is partially collapsed as shown, the bars 24 and 26 take the positions shown more clearly in FIGS. 5 and 6.

When it is desired to lock the two bars 24 and 26 together to form the rigid leg 12, it is only necessary to swing the handle 16 rearwardly so as to bring the two bars 24 and 26 into alignment. In moving these bars into alignment, the latch portion 50 of the latch 46 engages the edge 44 thereby springing the latch 46 outwardly, permitting the bar 26 to be swung onwardly until it engages the base portion 38 of the clip 32. In this position, the bar 26 is in alignment with the bar 24. Once this alignment is achieved, the latch 46 snaps inwardly into the illustrated position of FIG. 4 in which the bar 26 is locked against pivotal movement about the rivet 28.

From the foregoing, it will be apparent that the locking device is the ultimate in simplicity from the standpoints of both construction and operation. Thus, even the smallest child will encounter no difficulty in alternatively collapsing and erecting the chassis and the cost of a stroller incorporating the chassis will be minimized by reason of the simplicity of the construction and the ease with which it may be manufactured.

While I have described above the principles of my invention in connection with specific apparatus, it is to be clearly understood that this description is made only by way of example and not as a limitation to the scope of my invention.

What is claimed is:

1. In a doll stroller, a chassis comprising a pair of elongated flat legs which are crossed in scissors fashion and pivotally connected together where they cross, a horizontal rail pivotally connected at its opposite ends to the upper end portions of said legs, respectively; one of said legs including two elongated flat bar portions having opposite parallel sides, respectively, said bar portions being pivotally connected together with the sides thereof being parallel, said bar portions having opposite edges respectively, one of said bar portions having an extension which projects beyond the last-mentioned pivotal connection and which overlies in parallelism the other bar portion, a U-shaped locking clip formed of spring metal and having two arm portions which are flat and parallel and a base portion which connects said arm portions together, said clip transversely straddling said extension and said other bar portion with one arm portion being secured to said extension and said base portion extending across adjacent edges of said extension and said other bar portion, the end of the other arm portion remote from said base having a latch portion provided with two latch portions, one of said latch portions extending transversely across the edge of said other bar portion opposite said adjacent edges, the other of said latch portions extending angularly outwardly from the inner end of said one latch portion to a point beyond the plane of the outer side of said other bar portion.

2. In a doll stroller, a chassis comprising a pair of elongated flat legs which are crossed in scissors fashion and pivotally connected together where they cross, a horizontal rail pivotally connected at its opposite ends to the upper end portions of said legs, respectively; one of said legs including two elongated flat bar portions having opposite parallel sides, respectively, said bar portions being pivotally connected together to swing in parallel planes with adjacent inner sides being parallel to said planes and engaging each other, said bar portions having opposite elongated lateral edges, respectively, an extension of one of said bar portions projecting beyond the last-mentioned pivotal connection and overlying in parallelism the other bar portion; a U-shaped locking clip formed of spring metal and having two arm portions which are flat and parallel and a base portion which connects adjacent ends of said arm portions together, a latch on the opposite end of one arm portion and having two latch portions, one latch portion extending from said one arm portion inwardly toward the other arm portion for a distance approximately equal to the thickness of said other bar portion, the other latch portion extending from the inner end of said one latch portion angularly outwardly and away from said one latch portion to a point at least as far as the plane of said one arm portion; said U-shaped clip straddling said extension and said other bar portion with the other of said arm portions being secured to said extension and said one arm portion extending parallel to the outer side of said other bar portion, and said base portion and said one latch portion of said clip straddling the opposite edges of said other bar portion.

3. In a doll stroller, a chassis comprising a pair of elongated flat legs which are crossed in scissors fashion and pivotally connected together where they cross, a horizontal rail pivotally connected at its opposite ends to the upper end portions of said legs, respectively; one of said legs including two elongated flat bar portions having opposite parallel sides, respectively, said bar portions being pivotally connected together to swing in parallel planes with adjacent inner sides being parallel to said planes and engaging each other, said bar portions having opposite elongated lateral edges, respectively, an extension of one of said bar portions projecting beyond the last-mentioned pivotal connection and overlying in parallelism the other bar portion; a locking clip formed of a flat strip of resilient metal, said flat strip being bent to a U-shape to be provided with two parallel arm portions which are connected together by a base portion, the end of one of said arm portions remote from said base portion being further bent inwardly toward the other arm portion to provide a latching element and then angularly outwardly and away from said latching element; said clip straddling said extension and said other bar portion with the other of said arm portions being secured to said extension and said one arm portion extending parallel to an engaging the outer side of said other bar portion, and said base portion and said latching element straddling the opposite edges of said other bar portion.

4. In a doll stroller, a chassis comprising a pair of elongated flat legs which are crossed in scissors fashion and pivotally connected together where they cross, a horizontal rail pivotally connected at its opposite ends to the upper end portions of said legs, respectively; one of said legs including two elongated flat bar portions having opposite parallel sides, respectively, said bar portions being pivotally connected together to swing in parallel planes metal and having two arm portions which are flat and engaging each other, said bar portions having opposite elongated lateral edges, respectively, an extension of one of said bar portions projecting beyond the last-mentioned pivotal connection and overlying in parallelism the other bar portion; a U-shaped locking clip formed of spring metal and having two arm portions which are at and parallel and a base portion which connects adjacent ends of said arm portions together, a latch on the opposite end of one arm portion and having two latch portions, one latch portion extending from said one arm portion inwardly toward the other arm portion for a distance approximately equal to the thickness of said other bar portion, the other latch portion extending from the inner end of said one latch portion angularly outwardly and away from said one latch portion to a point at least as far as the plane of said one arm portion; said U-shaped clip straddling said extension and said other bar portion with said arm portions lying parallel to the outer sides of said extension and said other bar portion, the other of said arm portions being secured to one of said extension and other bar portion, and said base portion and said one latch portion straddling the opposite edges of the other of said extension and said bar portion.

5. In a doll stroller, a chassis comprising a pair of elongated legs which are crossed in scissors fashion and pivotally connected together where they cross, means connected to end portions, respectively, of said legs for holding said end portions in spaced apart relation, one of said legs including two elongated bar portions having opposite parallel lateral sides, respectively, said bar portions being pivotally connected together to swing in parallelism and having adjacent inner sides engageable with each other, said bar portions having opposite elongated front and rear edges, respectively, an extension of one of said bar portions projecting beyond the last-mentioned pivotal connection and overlying in parallelism the other bar portion; a U-shaped locking clip having two arm portions and a base portion, a latch on the free end of one arm portion having two latch portions, one latch portion extending from said one arm portion inwardly toward the other arm portion for a distance approximately equal to the thickness of said other bar portion, the other latch portion extending from the inner end of said one latch portion angularly outwardly and away from said one latch portion, said U-shaped clip straddling said extension and said other bar portion with said arms extending alongside said extension and said other bar portion, respectively, the other of said arm portions being secured to one of said extension and said other bar portion, and said base portion and said one latch portion embracing the opposite edges of the other of said extension and said bar portion to thereby releasably lock said extension and bar portion together.

6. In a doll stroller, a chassis comprising a pair of elongated legs which are crossed in scissors fashion and pivotally connected together where they cross, means connected to end portions, respectively, of said legs for holding said end portions in spaced apart relation, one of said legs including two elongated bar portions pivotally connected together to swing in parallelism, an extension of one of said bar portions projecting beyond the last-mentioned pivotal connection and overlying in parallelism the other bar portion; a U-shaped locking clip having two arm portions and a base portion, a latch on the free end of one arm portion having two latch portions, one latch portion extending from said one arm portion inwardly toward the other arm portion for a distance approximately equal to the thickness of said other bar portion, the other latch portion extending from the inner end of said one latch portion angularly outwardly and away from said one latch portion, said U-shaped clip straddling said extension and said other bar portion with said arms extending alongside said extension and said other bar portion, respectively, the other of said arm portions being secured to one of said extension and said other bar portion, and said base portion and said one latch portion embracing the opposite edges of the other of said extension and said bar portion to thereby releasably lock said extension and bar portion together.

References Cited by the Examiner
UNITED STATES PATENTS

| | | | |
|---|---|---|---|
| 327,105 | 9/1885 | Pierce | 297—55 |
| 1,785,343 | 12/1930 | Gilbert | 287—99 |
| 1,849,173 | 3/1932 | Carter | 292—87 |
| 2,278,810 | 4/1942 | Virtue et al. | 287—99 |
| 2,438,829 | 3/1948 | Skolnik | 297—56 X |
| 2,728,580 | 12/1955 | Preisler et al. | 280—36 |
| 2,758,847 | 8/1956 | Shone | 280—36 |
| 2,852,804 | 9/1958 | Alexander | 16—158 |

FOREIGN PATENTS

| | | |
|---|---|---|
| 321,951 | 11/1929 | Great Britain. |

FRANK L. ABBOTT, *Primary Examiner.*

RICHARD W. COOKE, JR., *Examiner.*